United States Patent [19]

Jennings

[11] Patent Number: 4,471,758

[45] Date of Patent: Sep. 18, 1984

[54] HOUSE SIDING SOLAR PANEL

[76] Inventor: Donald E. Jennings, 2402 - 6th Ave., N., Dennison, Iowa 51442

[21] Appl. No.: 407,998

[22] Filed: Aug. 13, 1982

[51] Int. Cl.³ .............................................. F24J 3/02
[52] U.S. Cl. .................................... 126/422; 126/428; 126/429; 126/440; 126/444; 98/41 SV
[58] Field of Search ............... 126/429, 431, 449, 432, 126/422, 421, 440, 444, 448, 450; 98/41 SV, 40 VT; 236/49

[56] References Cited

U.S. PATENT DOCUMENTS

| | | | |
|---|---|---|---|
| 2,559,870 | 7/1951 | Gay | 126/429 X |
| 3,073,525 | 1/1963 | Cislo | 98/41 SV |
| 3,981,295 | 9/1976 | Minnick | 126/440 X |
| 3,990,635 | 11/1976 | Restle et al. | 126/441 X |
| 3,994,276 | 11/1976 | Pulver | 126/427 |
| 4,076,013 | 2/1978 | Bette | 126/431 X |
| 4,085,731 | 4/1978 | Weir | 126/440 X |
| 4,219,009 | 8/1980 | Palmer | 126/422 |
| 4,237,865 | 12/1980 | Lorenz | 126/422 X |

FOREIGN PATENT DOCUMENTS 1172225 11/1969 United Kingdom ............. 98/41 SV

Primary Examiner—Randall L. Green
Attorney, Agent, or Firm—Zarley, McKee, Thomte, Voorhees & Sease

[57] ABSTRACT

A house siding solar panel for the efficient conversion of solar radiation into usable heat energy, which includes an aesthetically pleasing housing having forwardly beveled side edges so that the panels may be mounted directly to the side of the house much like conventional siding, and present an aesthetically pleasing apearance. The front wall of the housing is a prismatic lens which serves to direct diffuse solar radiation perpendicularly rearward to a highly heat-absorbent and conductive selective surface plate positioned parallel to the lens. Unheated air from the room to be heated is introduced into an air channel behind this plate. The air channel extends substantially over the rear surface of the plate and allows the unheated air to conductively obtain heat energy from the plate, which causes said air to convectively rise to a heated air outlet, wherein the heated air can be transported for the heating of the interior of the house. A thermostatically controlled unheated air vent associated with the fan allows the selective introduction of unheated air to the panel. Likewise, a thermostatically controlled heated air duct selectively allows the heated air to be transported for use. Specially designed air diffusers at opposite ends of the air channel next to the plate force the unheated air to be uniformly distributed over the width of the plate as it travels convectively upward. These diffusers present less air passage openings at the center of the panel where the air inlets and outlets are attached in fluid communication, and present greater air passage openings towards each end of each diffuser so that air is forced to uniformly distribute across the air channel.

27 Claims, 9 Drawing Figures

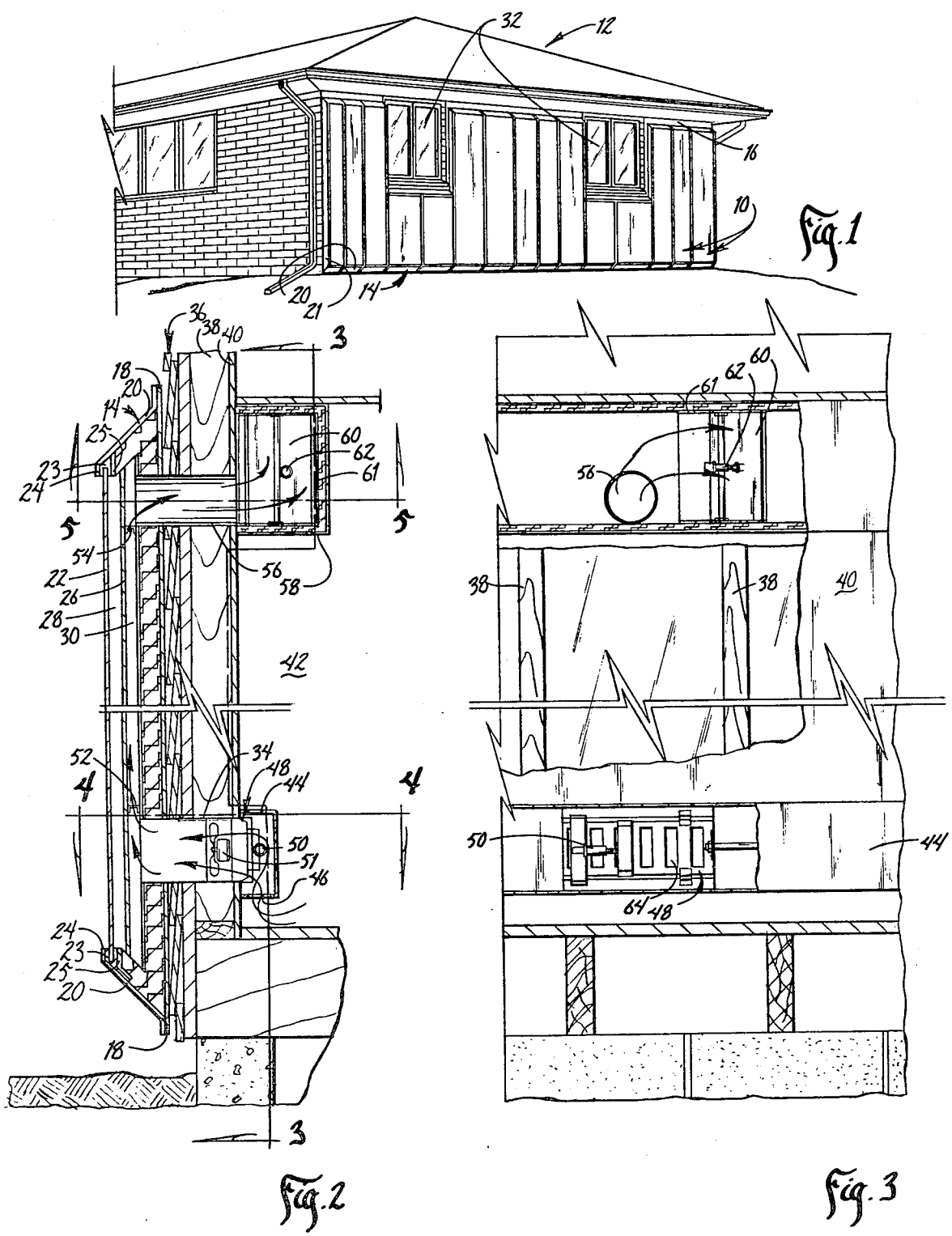

HOUSE SIDING SOLAR PANEL

BACKGROUND OF THE INVENTION

1. Field of Invention

This invention relates to solar panels, more particularly to solar panels which can be aesthetically incorporated as house siding panels.

2. Description of Problems in the Art

The depletion of our non-renewable energy resources has spawned ever-increasing interest in alternative energy sources. The clean, abundant, and readily available energy from solar radiation has presented attractive possibilities for reducing our dependence upon fossil fuels. The technology of harnessing solar energy has advanced to the stage where its cost-effectiveness makes it a very appealing energy alternative to individual home owners.

A major problem associated with the use of solar panels on individual dwelling units is finding a position to mount the panels which does not conflict with other structure of the house, which allows for easy access for maintenance, and which is aesthetically acceptable to both the home owner and others in the neighborhood. It should be noted that many neighborhoods and communities have zoning ordinances or restrictive covenants tied to certain property which prohibit the construction of devices such as solar panels or arrays which are mounted upon the roof or otherwise distract from the aesthetic appearance of dwellings and the neighborhood.

Therefore, there is a real need for solar panels which are operatively mountable upon houses and at the same time present an aesthetically pleasing appearance. There is also a real need for solar panels which are easily accessible for cleaning, repair, and maintenance and which are available in a variety of sizes to conform to different housing configurations.

Traditional solar collectors have been designed to either be positioned in an angular orientation towards the sun or are equipped to turn with the rotation of the earth to follow the sun during the day. Many of these collectors are water-heating collectors which require angular mounting so that they may be operable year-round, regardless of the path of the sun through the sky. Solar panels which heat air for space heating purposes are used only during the winter months when the sun's path through the sky is lower.

In order to be cost-effective, solar panels must be as efficient as possible. Additional problems are faced with solar collectors that utilize heat conduction and convection principles to heat interior air. An initial problem is constructing the collector so that the unheated air is subjected to as much surface area of the heat absorption plate as possible as it passes by to the air outlet. Many solar heating panels simply introduce the unheated air into a chamber adjacent to the heat absorbing plate without directing the air for uniform distribution throughout the plate surface.

Additionally, special problems are presented when the interior air has become heated to a sufficient degree. The solar panel which works on the principle of absorbing the heat energy of solar radiation and then conductively transferring that to air passed by the absorption plate, cannot be simply shut off like an electric furnace. To maximize efficiency, thermostatically controlled vents are needed at both the unheated air introduction points and at the heated air outlet points.

Finally, some solar panels have problems in sufficiently retaining the derived heat from the solar radiation with sufficient efficiency to become cost efficient.

It is therefore an object of this invention to provide a house siding solar panel which provides for the efficient economical conversion of solar radiation into usable heat energy.

A further object of this invention is to provide a house siding solar panel which presents an aesthetically pleasing structure for mounting upon the exterior walls of a house.

A further object of this invention is to provide a house siding solar panel which can be used in combination with other panels to provide an aesthetically pleasing house exterior.

Another object of this invention is to provide a house siding solar panel which efficiently directs diffuse solar radiation to a heat absorbing plate, regardless of the angle of incidence of said solar radiation.

Another object of this invention is to provide a house siding solar panel which utilizes heat conduction and convection principles to derive heat energy from solar radiation.

Another object of this invention is to provide a house siding solar panel which provides for uniform distribution and flow of air across the rectangular surface of a heat absorption plate.

A further object of this invention is to provide a house siding solar panel which has thermostatically controlled vents for the air inlet and air outlet to prevent night time heat loss and excess summer time heat gain.

A further object of this invention is to provide a house siding solar panel which utilizes a thermostatically controlled switching mechanism to coordinate the opening and closing of air inlet vents for a plurality of solar panels.

Another object of this invention is to provide a house siding solar panel which effectively and efficiently insulates said solar panel from heat loss.

A further object of this invention is to provide a house siding solar panel which is cost-efficient, economical, durable easily accessible and maintained, and has a minimum of moving parts.

These and other objects, features, and advantages of the invention will become apparent with reference to the accompanying specification and drawings.

SUMMARY OF THE INVENTION

This invention utilizes a generally rectangularly shaped housing which can be made to conform to different dimensional specifications. Inwardly beveled top and bottom side walls extend from a one piece back wall to a front prismatic lens which forms the sealed, airtight front wall of the housing. Interposed between the prismatic lens and the back wall is a parallelly positioned selective surface heat absorbing plate having an air channel adjacent to its surface facing the back wall.

The prismatic lens has properties which direct incident solar radiation perpendicularly rearward to the absorption plate regardless of the angle of incidence which the solar radiation hits the lens. This is particularly important in that the solar panels will generally be vertically mounted upon the side of a dwelling unit. The bottom end of each solar panel is in fluid communication with an air inlet which in turn is in fluid communication with the interior area to be heated. An air register in the room to be heated utilizes a thermostatically con..olled vent and fan to pull unheated air into the air channel adjacent to the absorption plate.

An air outlet is likewise in fluid communication with the air channel in the housing and with a heated air duct inside the house which carries the heated air either to the room to be heated or to the air distributing mechanism of the furnace in the house. The air outlet is located at the top of the housing of the panel.

Specially designed air diffusers are located at the top and bottom of the air channel, but between the air inlet and air outlet. These diffusers are narrow, elongated pieces to conform with the cross-sectional shape of the narrow air channel which passes along the entire surface of the rectangular absorption plate.

Air openings are positioned along the diffusers of varying size and spacing to force the incoming air to spread out uniformly across the air channel. This is accomplished by having less air opening area at the middle of the diffuser than at the ends so that as the inletted air directly hits the middle of the diffuser, its full volume is not allowed to pass directly through, but rather a proportion of said air is forced to move to either side where it then enters the air chamber so that a uniform volume of air flows past the total rectangular surface of the absorption plate.

In order to increase the efficiency of the panel, a layer of insulation can be inserted between the rear wall and the air channel to prevent conductive transfer of the heat in the air channel to escape through the back wall. Additionally, a layer of heat reflecting foil can be positioned between the layer of insulation and the air channel to retain the heat absorbed by the absorption plate in the air channel.

BRIEF DESCRIPTION OF THE DRAWINGS

FIG. 1 is a perspective view of a house with a plurality of house siding solar panels operatively mounted upon the house.

FIG. 2 is a side sectional view of the invention as mounted upon the house of FIG. 1.

FIG. 3 is a front sectional view with a partial cutaway taken along lines 3—3 of FIG. 2.

DETAILED DESCRIPTION OF THE PREFERRED EMBODIMENT

Figure 4:
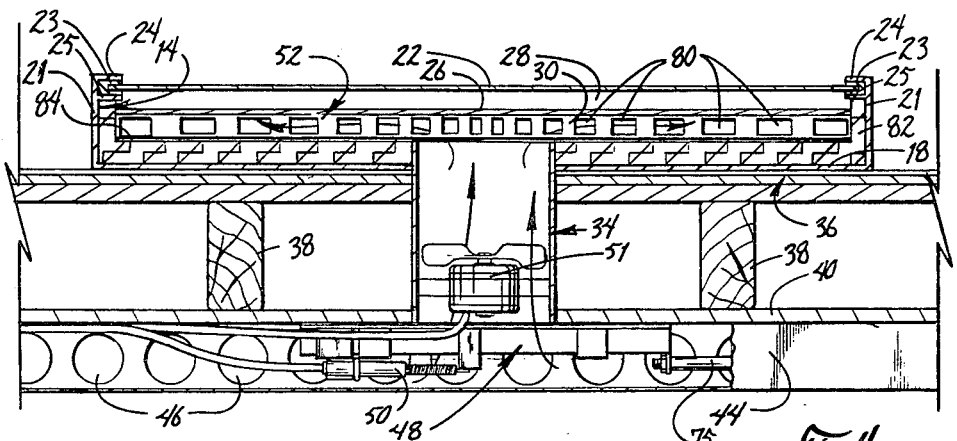
FIG. 4 is a sectional view taken along lines 4—4 of FIG. 2.

In reference to the drawings, and particularly FIG. 1, there is shown house siding solar panels 10 operatively mounted upon the exterior wall of house 12, in accordance with the invention. Panels 10 are of such configuration and of variable size so that they present an aesthetically pleasing siding surface for house 12, not being readily discernable as solar panels.

The total structure of the invention 10 can be seen in FIG. 2. Panel housing 14 is mounted to the exterior 16 of house 12.

Housing 14 comprises a rectangular backwall 18 which mounts directly to exterior 16 of house 12. Inwardly beveled top and bottom sidewalls 20 extend from backwall 18. Vertical sidewalls 21 are perpendicular to backwall 18 to allow side-by-side mounting of solar panels 10. The front wall of housing 12 is formed by solar radiation passing prismatic lens 22 which is sealingly mounted inside the turned-in front edges 24 of side walls 20 and 21. A U-shaped gasket 23 is secured around the peripheral edges of lens 22 and then an L-shaped retaining member 25 is rigidly fastened to the inside surfaces of sidewalls 20 and 21 securingly holding U-shaped gasket 23 and lens 22 against turned-in front edges 24 of sidewalls 20 and 21, to produce a sealing, air-tight fit. The total width of housing 14, from backwall 18 to lens 22 is on the order of 2½ inches, in direct comparison to conventional solar panels which many times are five to seven inches thick. This structural feature further enhances the aesthetic qualities of panels 10, reducing their cumbersomeness and producing their siding-like appearance.

A copper heat-absorbing selective surface 26 is positioned parallelly between lens 22 and backwall 18 inside housing 14. Copper selective surface 26, in the preferred embodiment, is 0.005 inches thick and extends in all four directions to the sidewalls 20 and 21. Thus, copper selective surface 26 essentially segregates the interior of housing 14 into two parts, first, an air space 28 between lens 22 and copper selective surface 26, and second, an air channel 30 between copper selective surface 26 and backwall 18. Considering the narrow overall width of panel housing 14, air space 28 and air channel 30 are approximately ⅝ths of an inch thick and extend to all four sidewalls 20 and 21 of housing 14.

Air space 28 between lens 22 and copper selective surface 26 serves as dead air space to produce an insulating effect to retain the heat absorbed by selective surface 26. Air, being the best insulator, accomplishes this purpose better than other insulating materials.

Panel housings 14 are modular in that they can be abuttingly mounted one next to the other to cover the entire southern facing side of house 12, but are variable in size so that they may be custom fitted around windows, doors, etc., so as to not obstruct the functional pre-existing structure of house 12. The simple, elongated rectangular shape of housings 14 allows them to be mass produced in plurality of sizes to facilitate the custom fitting of exterior walls of various houses. Housings 14 are also all usually two feet or less in width to add further flexibility in the placement of panels 10. Conventional solar panels are many times four feet or more in width, creating fitting problems.

The beveled nature of side walls 20 along with the 2½ inch "thinness" and two foot or less width of housings 14, presents an aesthetically attractive siding-like component which does not detract from the appearance of the house to which they are mounted. The flexibility in size of the panels 10 also facilitates the custom fitting of an entire side of the exterior 16 of a house 12 as shown in FIG. 1. The beveled sidewalls 20, when fitted around windows 32 of house 12, create a bay window effect which would not be possible with flat edges. This further enhances the aesthetic qualities associated with panels 10. Additionally, beveled sidewalls 20 disallow the collection of standing water upon the upper ends of panel housings 14, or the collection of other debris, further enhancing their appearance and maintainability.

Unheated air, i.e., the ambient air of room 42 (generally no cooler than 55° F.) is introduced into solar panel 10 by air inlet 34 which extends through house 12 siding 36, frame 38 and interior dry wall 40. Air inlet 34 is a hollow rectangular member having a width of approximately eight inches. One end is in fluid communication with the lower part of air channel 30, while the other end is in fluid communication with the lower portions of room 42, of house 12. An air register 44 is placed over the room end of air inlet 34, which has air entrance openings 46 spaced along its bottom. A thermostatically controlled vent 48 is positioned inside air register 44 covering the room opening end of air inlet 34. Vent 48 opens and closes in accordance with the dictates of a thermostat which is electrically connected to an electrical actuator 50 on vent 48. A fan 51 is positioned in the interior of air inlet 34, and pulls air through air register 44 and vent 48 into air channel 30.

To uniformly distribute the unheated air coming from air inlet 34 into air channel 30, air diffusers 52 and 54 are positioned at opposite ends of air channel 30. Air diffusers 52 and 54 are C-shaped in cross-section, elongated strips extending the width of panel housing 14 and have air openings cut out of its horizontal surface which become progressively larger towards opposite ends to force unheated air to spread out across the width of air channel 30. The diffused air entering through lower diffuser 52 conductively absorbs heat from surface 26, which heats the air and causes it to convectively rise through upper diffuser 54.

The heated air is outletted at air outlet 56, which is a standard circular flexible dryer duct attached in fluid communication with the upper portion of air channel 30 above upper air diffuser 54, and extends through back wall 18, siding 36, frame 38, and dry wall 40 into air ducts 58. Air duct 58 has a thermostatically controlled door 60 which matingly fits the interior of air ducts 58 and is hingedly attached to an electric actuator 62 so that it may be selectively opened and closed in accordance with the thermostat setting. Air duct 58 can extend across the upper portion of room 42 and can have an opening or openings to distribute the heated air into room 42. Optionally, air duct 58 can fluidly connect with the air distributing means of the conventional heating source which pre-existed in house 12.

Figure 7:
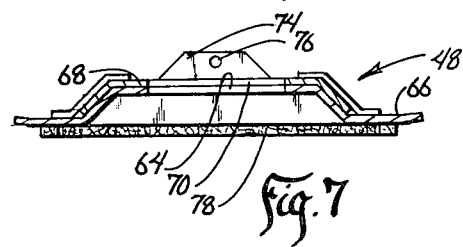
FIG. 7 is a sectional view taken along lines 7—7 of FIG. 6.
Figure 6:
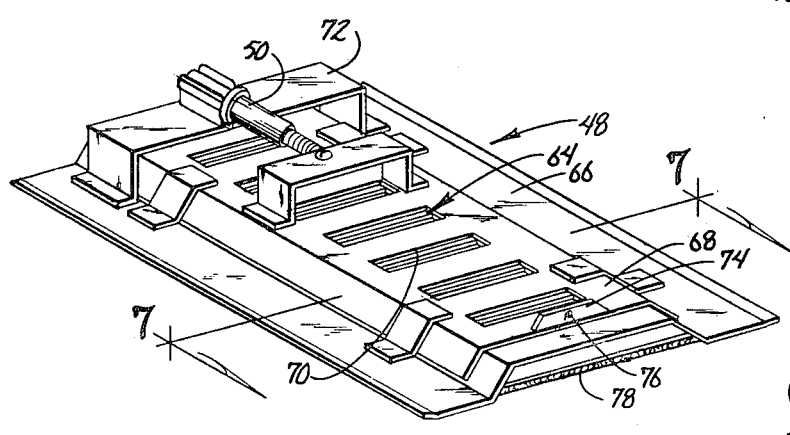
FIG. 6 is a perspective view of the unheated air vent of the invention.

With reference to FIG. 3, it can be seen exactly how unheated air is brought into air intake 34, and how heated air is introduced into air duct 58. Vent 48 has a plurality of evenly spaced rectangular openings 64 along base plate 66. The exact structure of vent 48 can be seen in greater detail in FIGS. 6 and 7. A slidably attached vent cover 68 having matching evenly spaced openings 70 is closed and opened by actuator 50 which is attached by mounting bracket to vent base plate 66. Vent cover ear 74 extends perpendicular to the vent cover 68 and has an aperture 76 which allows it to be connected in series with other vents 48 of other solar panels 10, so that only one actuator 50 needs to be used for each room 42 of house 12. An insulation band 78 is positioned around the edges of vent 48 to seal off any possibility of escaping air when vent 48 is closed.

Door 60 is pivotally hinged to top and bottom sides of door housing 61, which is force fitted into air duct 58, and is positioned so as to control the air movement out of air outlet 56.

Figure 5:
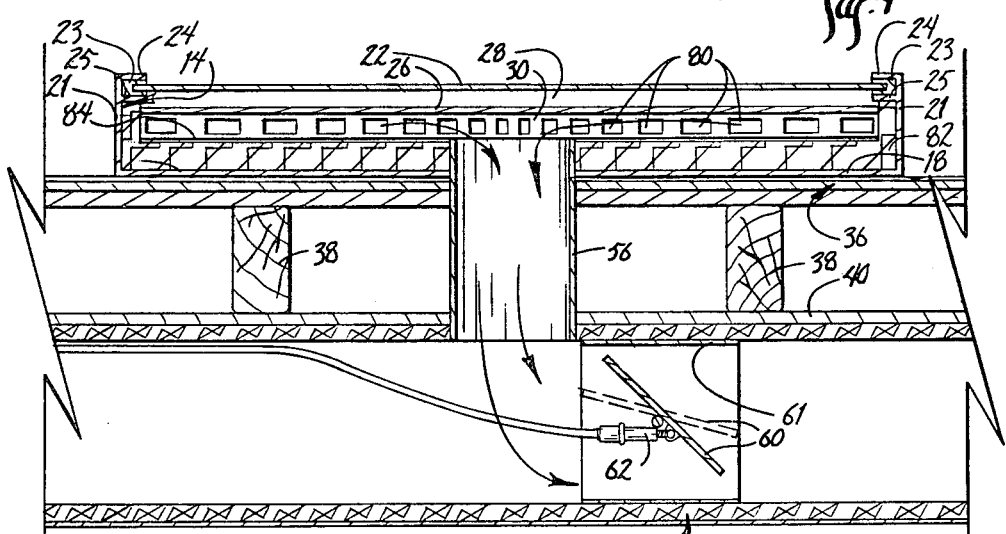
FIG. 5 is a sectional view taken along lines 5—5 of FIG. 2.

The exact structure of diffusers 52 and 54 can be seen in FIGS. 4 and 5. In FIG. 4, air inlet 34 communicates with air channel 30 directly below air diffuser 52. The volume of air being forced out of air inlet 34 by fan 51 is met primarily by the middle portion of diffuser 52. Diffuser openings 80 are therefore varied in size so as to disperse the volume of air along the diffuser so that the air seeks out the larger diffuser openings 80 towards the ends of diffuser 52.

Likewise, diffuser 54 is similarly configured and holds the layer of convectively rising air from air channel 30 uniformly across surface 26 and presents this to air outlet 56.

It is to be understood that the openings 80 in diffusers 52 and 54 can be of different configurations, for example, openings 80 could be oval shaped, which would be more easily manufactured. Alternatively, diffuser openings 80 could be formed from uniform circular openings which are spaced further apart at the middle of diffusers 52 and 54 and are then progressively closer together towards either ends of diffusers 52 and 54.

In operation, solar panels are installed and function as follows: After determining the characteristics of house 12 and the surface to which panels 10 are to be installed is selected, the configuration of panel housings 14 is determined to allow custom fitting in such a way to make the solar panel array aesthetically pleasing in appearance.

Once panel housings 14 are mounted in the aesthetically pleasing arrangement on the exterior 16 of house 12, air inlets 34 and air outlets 56 are inserted through the dry wall 40, frame 38, siding 36 and backwall 18 of each individual housing 14. Air duct 58 is then constructed to receive all air outlets 56 from all housings 14. Thermostatically controlled door 60 is then positioned to allow the outlet of heated air to be controlled.

It should be noted that an air distributing means can be inserted into air ducts 58 to assist in the distribution of heated air coming from air outlets 56.

A fan 51 and vent 48 are then installed on each air inlet 34. Air register 44 is then mounted over the plurality of vents 48 and actuator 50 is connected by rods 75 to vent cover ears 74 of all vents 48 for room 42 so that vents 48 can be thermostatically controlled in unison.

Once installed, the plurality of solar panels 10 are put into operation. Sunlight strikes prismatic lens 22 which directs the diffuse solar radiation perpendicularly rearward to copper heat absorbing selective surface 26. The heat absorbed by surface 26 is then conductively transferred to the air in air channel 30.

The air in air channel 30 is supplied by the push created by fan 51 inside of air inlet 34. The thermostatic control for room 42 causes actuators 50 and 62 to open vents 48 and 50 which allows unheated air to be sucked in air entrance openings 46 of air register 44 and pass into the lower end of air channel 30. Lower air diffuser 52 causes the inputted air to be uniformly distributed across the width of air channel 30. As the air comes into contact with copper selective surface 26, and begins absorbing heat, the air rises partly because of the back pressure of fan 51 and also because of natural convection principles. This moving air literally "scrubs" heat from the thin copper surface 26 and rises through upper diffuser 54 to air outlet 56. There, the now heated air enters air ducts 58 and travels through thermostatically controlled door 60 which is held open by actuator 62, to where the heated air either exits directly to room 42, or is transported to the existing heat distributing means of house 12 for redistribution to room 42.

Once top of channel 30 drops below room temperature of room 42 because of nightfall or clouds, actuators 62 and 50 react by closing, and fan 51 ceases operation, until the thermostat again directs the distribution process to restart.

The damper system comprising of the vents 48, fan 51 and door 60, all being electrically connected to the thermostat controlling temperature in the top of channel 30, provide for a system which is compatible with the original air distribution connected to the furnace of house 12. Additionally, by closing off solar panels 10, room 42 nighttime heat loss can be reduced and summer heat gain from panel 10 can be reduced.

The air inlets 34 and unheated air register 44 are located at just above floor level of room 42 so that the system heats the coolest air first, which increases efficiency. The energy transfer from sunlight to usable heat is accomplished by four steps; first, the collection of solar radiation at copper selective surface 26 utilizing prismatic lens 22. Secondly, conduction of the absorbed heat to the air in air channel 30. Third, the convective process of the heated air rising to the air outlet 34. Finally, the distribution of the heated air to room 42.

The preferred embodiment can also contain the following modifications. An insulation layer 82 can be attached to back wall 18 and top and bottom sidewalls 20 and vertical sidewalls 21 in the interior of panel housing 14. This insulation layer 82 enhances efficiency of the system by reducing heat loss through walls 18, 20 and 21. Additionally, a layer of heat reflecting foil 84 can be attached to the interior side of insulation layer 82 so that it is adjacent to air channel 30. This heat reflecting foil 84 would serve to increase efficiency by disallowing radiant heat in air channel 30 to be absorbed by insulation layer 82.

Figure 8:
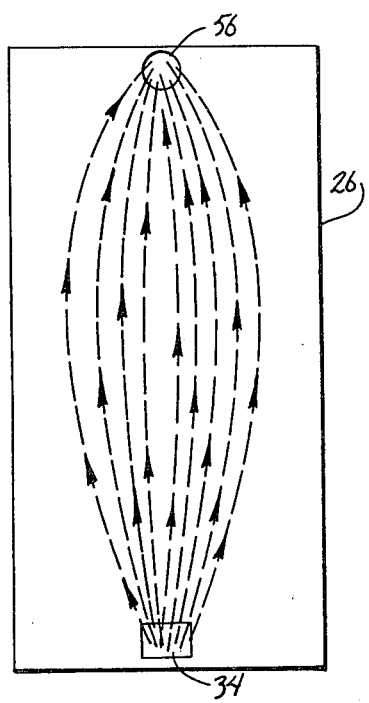
FIG. 8 is a schematic of the air flow along an absorption plate wherein the air flow is not diffused in accordance with the invention.
Figure 9:
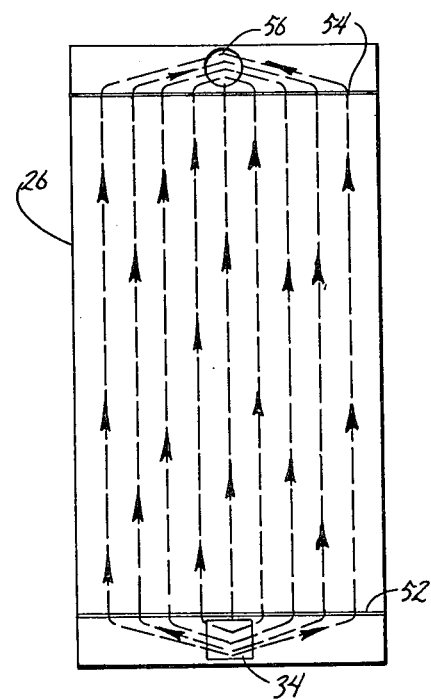
FIG. 9 is a schematic of the air flow along the absorption plate wherein the air flow is diffused in accordance with the invention.

FIGS. 8 and 9 schematically depict the advantage of uniform air distribution across copper selective surface 26 produced by diffusers 52 and 54. In FIG. 8, the arrowed-lines show how unheated air would travel across selective surface 26 without diffusers 52 and 54. As can be seen, a substantial surface area of selective surface 26 is missed by the air flow, thereby not utilizing the heat energy contained in those areas.

Compare this with FIG. 8 showing how diffusers 52 and 54 force the unheated air to uniformly distribute along a maximum surface area of selective surface 26. This greatly increases the efficiency of the solar panel 10 by "scrubbing" a maximum amount of heat off selective surface 26 immediately after it is absorbed. It should be noted that this maximum utilization of surface area can be accomplished only by directing the unheated air vertically upward. Other attempts have been made to baffle the unheated air through a maze-like configuration along a heat absorbing wall, but these attempts fall short in that any time air is directed around a corner, the path of the air flow naturally migrates to a certain pattern which will leave un-utilized areas similar to those shown in FIG. 8. For instance, if unheated air is directed vertically upward along a heat-absorbing surface, and then by virtue of a wall between the air inlet and air outlet is directed over this wall back down to an air outlet at the bottom of the heat absorbing surface, the air flow will take an arc-like flow path which will miss the upper corners of the heat absorbent surface and areas along the edges of the surface.

The heat absorbing copper selective surface used in the preferred embodiment absorbs on the order of 96% of the incident solar radiation and has an emissivity factor of 0.1, which is a primary feature of a selective surface.

In another modification, air register 44 could be inverted so that air openings 46 point upward and inverted air register 44 could be placed over air outlets 54 to distribute heated air directly to room 42. It should also be understood that in some instances a plurality of air inlets 34 could be connected in fluid communication by an air duct similar to air duct 58 and utilize a thermostatically controlled door 60 to monitor the intake of unheated air, rather than using vents 48.

Actuators 50 and 62 can comprise a device which, when actuated, electrically heats a heating element which in turn heats up a fluid inside the actuator which emits a gas. This gas forces the device to slidably expand to control the opening of vents 48 and doors 60. Upon deactivation, the gas condenses and the device collapses to its original position.

Thus, it can be seen the invention achieves at least all of its stated objectives. The above description is of the preferred embodiment of the invention only and it is to be understood that changes can be made staying within the boundaries of the invention.

What is claimed is:

1. A house siding solar panel comprising:

a housing having a front wall, a back wall, end walls, and side walls defining a chamber, and an air inlet and air outlet;

a front sunlight-exposed surface defining said front wall of said chamber and having such properties as to pass substantially all the incident solar radiation striking said surface perpendicularly rearward into said chamber regardless of the angle of incidence of said radiation;

a highly heat absorbent and heat conductive selective plate positioned in said chamber, spaced between and parallel to said sunlight-exposed surface and said back wall so that an airtight first layer of air exists between said plate and said sunlight-exposed surface and a second layer of air exists between said plate and said back wall, whereby the heat energy of said perpendicularly passed solar radiation is absorbed by said plate and said heat energy is conductively transferred to said second air layer;

means for introducing unheated air to said air inlet for channeling to said second air layer at selected times;

means for uniformly distributing unheated air throughout said second air layer which enters through said air inlet comprising a fan forcing said unheated air to pass through said air inlet and a diffuser means mounted in said second layer of air which urges said unheated air coming from said unheated air inlet to spread out evenly over said second air layer; and means for removing heated air, which has conductively absorbed said heat energy from said plate, from said second air layer through said air outlet at selected times.

2. The device of claim 1 wherein said housing is of rectangular shape having beveled top and bottom end walls converging from said back to said front sunlight-exposed surface and perpendicular vertical sides, said housing being adaptable to be fitted either singly or in combination with other said solar panels on the side of a house or other suitable structure.

3. The device of claim 1 wherein said front sunlight-exposed surface comprises a solar radiation passing prismatic plate which directs diffuse solar radiation perpendicularly rearward regardless of said radiation's angle of incidence upon said sunlight-exposed surface.

4. The device of claim 3 wherein said sunlight-exposed surface comprises a prismatic acrylic surface.

5. The device of claim 1 wherein said heat plate comprises a copper, heat-absorbing selective surface.

6. The device of claim 1 wherein a layer of insulation material is positioned against the interior surface of said back, its forwardmost surface being adjacent to said second air layer.

7. The device of claim 6 wherein a layer of heat reflecting material is disposed against the forwardmost surface of said layer of insulation.

8. The device of claim 1 wherein said means for introducing unheated air to said air inlet comprises:
    (a) an elongated, horizontal air register having openings for the entrance of said unheated air into said register, said register being positioned in the interior of the area to be heated;
    (b) A thermostatically controlled, adjustably closeable and openable unheated air vent positioned inside said air register and covering said air inlet.

9. The device of claim 8 wherein said thermostatically controlled air vent comprises:
    (a) a vent plate extending across and around said air inlet, said vent plate having a plurality of uniformly spaced openings along its length;
    (b) a vent cover having matching uniformly spaced openings along its length and being slidably adjustably mounted over said vent plate;
    (c) a thermostatically controlled actuator attached to said vent cover, which when not activated, holds said vent cover in such position that said openings of said vent cover are not aligned with said openings of said vent plate so that air cannot pass through said vent, but that when activated, slidably moves said vent cover so that said openings of said vent cover and said vent plate openings are in alignment to allow passage of unheated air through said vent.

10. The device of claim 8 wherein the outer edges of said unheated air vent have means attached to said edges to disallow passage of air around said edges.

11. The device of claim 8 wherein said vent cover of said unheated air vent has a coupling means attached to its top surface for the attachment of a connecting rod connecting the vent cover of an unheated air vent of an adjacent solar panel for concurrent utilization of said thermo-actuator.

12. The device of claim 11 wherein said coupling means comprises an L-shaped ear member having one leg attached to said vent cover and the other leg extending perpendicularly upward and having an aperture for attachment of said connecting rod by connecting means.

13. The device of claim 8 wherein said air vent is variably adjustable so as to allow the variable intake of unheated air into said air inlet, said intake ranging from a fully closed air vent to a fully open air vent.

14. The device of claim 1 wherein said diffuser means comprises: first and second elongated diffuser pieces having air passage openings disposed along their lengths and being of such configuration that an increasingly larger opening area is presented the farther the distance from the middle of said diffuser piece. said middle of said diffuser piece being positioned closest to said unheated air inlet, said first diffuser piece being positioned close to said air inlet, said second diffuser piece being positioned close to said air outlet.

15. The device of claim 14 wherein said diffuser piece further comprises an elongated strip having rectangular slots of varying widths cut out along its length, said slots being narrow at said middle of said diffuser piece and becoming increasingly wider towards both ends of said diffuser piece, so that air striking said middle of said diffuser piece will be forced to uniformly spread out to the larger openings at the sides of said diffuser pieces, and be uniformly distributed after passing through said diffuser piece.

16. The device of claim 1 wherein said means for removing heated air from said second air layer comprises:
    (a) said heated air outlet connected in fluid communication with said second layer of air;
    (b) an air duct connected in fluid communication with said air outlet and extending from air outlet to carry said heated air to an area for use; and
    (c) a thermostatically controlled air gauge which hingedly closes and opens located in said air duct.

17. The device of claim 16 wherein said air outlet comprises a three inch flexible dryer circular-in-cross-section duct pipe.

18. The device of claim 16 wherein said air duct comprises a rectangular-in-cross-section hollow housing connected in fluid communication with said air outlet and the area to be heated.

19. The device of claim 16 wherein said air duct is connected in fluid communication with said air outlet and with the air distributor means of a furnace for said house.

20. The device of claim 16 wherein said thermostatically controlled air gate comprises:
    (a) a hingedly adjustable door which matingly fits within the interior of said air duct;
    (b) a thermostatically controlled actuator operably connected to said door.

21. The device of claim 16 wherein said air duct is connected in fluid communication with air outlets of a plurality of solar panels and said air gate is positioned so as to control air movement out of said air duct.

22. The device of claim 16 wherein said air gauge is variably adjustable so as to allow the variable outlet of heated air, said outlet ranging from a fully closed air gate to a fully opened air gate.

23. The device of claim 1 wherein said solar panel may be directly mounted to the existing siding of said house by mounting means.

24. The device of claim 1 wherein said air inlet is located lower than said air outlet.

25. The device of claim 1 wherein said air inlet is located adjacent to the bottom edge of said housing.

26. The device of claim 1 wherein said air outlet is located adjacent to the top edge of said housing.

27. The device of claim 1 wherein said unheated air inlet is located at the bottom of said housing and said heated air outlet is located at the top of said housing so that the air in said second layer of air convectively is caused to continuously move from said bottom to said top of said second layer of air of said housing.

* * * * *